United States Patent
Mizutani et al.

(10) Patent No.: US 6,195,170 B1
(45) Date of Patent: Feb. 27, 2001

(54) FACSIMILE APPARATUS THAT DETECTS PRINT FAILURE TO RETAIN DATA IN MEMORY

(75) Inventors: Satoshi Mizutani, Nagoya; Naoki Oda, Kasugai; Tetsuya Kato, Nagoya, all of (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/089,233

(22) Filed: Jun. 2, 1998

(30) Foreign Application Priority Data

Jun. 7, 1997 (JP) .................................................. 9-165327

(51) Int. Cl.[7] .................................................. G06F 15/00
(52) U.S. Cl. .......................... 358/1.14; 358/1.9; 358/401; 358/1.16; 358/296; 399/27
(58) Field of Search ............................... 358/1.1, 1.9, 401, 358/501, 296, 502, 503, 404, 1.14, 1.16; 399/27, 29, 31, 33, 21; 347/3

(56) References Cited

U.S. PATENT DOCUMENTS 5,706,037 * 1/1998 McIntyre ..................................... 347/3
5,721,581 * 2/1998 Saito et al. ............................. 347/249

FOREIGN PATENT DOCUMENTS 9-314964 * 12/1997 (JP) .................................. B41J/29/46

* cited by examiner

Primary Examiner—Edward L. Coles
Assistant Examiner—Mark Wallerson
(74) Attorney, Agent, or Firm—Oliff & Berridge, PLC

(57) ABSTRACT

A facsimile apparatus capable of preventing the loss received information even if there is a possibility of a print failure. The facsimile apparatus has a reception memory that stores the data received, a print executing unit that prints, on a recording sheet, the data stored in the reception memory, and a print-failure determining unit that determines whether there is a possibility that a print failure will occur if the print executing unit performs printing. If it is determined that there is the possibility of the print failure, a print stopping unit stops execution of printing by the print executing unit, and a data retaining unit retains the data stored in the reception memory, even after the data has been printed out by a forced printing function. More specifically, if a determination cannot be made regarding a paper jam or an ink shortage due to, for example, strong external light coming in, or if it is determined that there is a print failure, the apparatus does not start printing, but displays a message "RECEIVED . . . ", and retains the received data in the reception memory. The forced-printing of the data can be performed by operating a start switch. The received data thus retained can be maintained even after the forced printing, and is erased only when a reset instruction is input.

22 Claims, 9 Drawing Sheets

FACSIMILE APPARATUS THAT DETECTS PRINT FAILURE TO RETAIN DATA IN MEMORY

BACKGROUND OF THE INVENTION

1. Field of Invention

The invention relates to a facsimile apparatus and, more particularly, to a facsimile apparatus capable of ensuring that the information received is available to a user in a understandable or legible manner even when there is a possibility of the occurrence of a print failure.

2. Description of Related Art

There are known facsimile apparatuses having an ink jet-type print head. This type of facsimile apparatus determines whether the ink is about to run out by, for example, counting the number of times of printing, or detecting the amount of ink remaining in an ink tank. If it is determined that the ink is about to run out, the facsimile apparatus performs an operation to prevent the occurrence of a defective print due to ink shortage; for example, the apparatus displays a message to recommend that the ink cartridge be replaced. In a known facsimile apparatus equipped with a copying function, the amount of toner remaining is detected by a sensor or the like and, if the toner becomes short, a caution message, for example, "TONER SHORTAGE", or the like, is displayed.

However, the aforementioned facsimile apparatuses do not become immediately unable to print when it is determined that the ink or toner is about to run out. Therefore, a user sometimes continues to use the apparatus without noticing the caution message or the like, so that the facsimile apparatus will finally produce a printout that is illegible.

Further, a facsimile apparatus employing an optical sensor to determine whether the ink or toner is running short have a danger that, if such an apparatus is installed in a place where the apparatus is likely exposed to strong light, for example, near a window, effective determination may be impeded due to strong light, for example, during hours when the sun light strikes the facsimile apparatus. Therefore, this type of facsimile apparatus has a danger of incorrectly determining that the ink is not running out despite the fact that the ink is actually running out, thereby resulting in a print failure.

If data received is not properly printed out because of a print failure, the receiver may ask the sender to re-transmit the facsimile data. However, there are cases where the sender is out of the office and cannot be reached, or where the sender is unknown. That is, when there is a print failure there are many cases where it is unknown who sent the facsimile information, or what information was received.

SUMMARY OF THE INVENTION

Accordingly, it is an object of the invention to eliminate incidents where the content of information received becomes unknown or unidentifiable in a case where there is a possibility of the occurrence of a print defect.

According to one aspect of the invention, there is provided a facsimile apparatus including a reception memory that stores data received, a print executing unit that executes printing on a recording sheet on the basis of the data stored in the reception memory, and a print-failure determining unit that determines whether there is a possibility that a print failure that includes at least a print density thinning and a partial depletion will occur if the print executing unit performs printing. If the print-failure determining unit determines that there is a possibility of a print failure, a print stopping unit stops execution of printing by the print executing unit. If the print-failure determining unit determines that there is a possibility of a print failure, a data retaining unit retains the data stored in the reception memory even after the data has been printed out.

In the facsimile apparatus, if it is determined that there is a possibility of a print failure that will render the print image illegible, the print stopping unit stops the printing operation and the data retaining unit retains the data stored in the reception memory. Therefore, even a page that has been printed by a forced printing function or the like, while it is determined that there is a possibility of a print failure, can be printed again on the basis of the data retained by the data retaining unit, after the cause for the failure has been removed by, for example, replacing the ink cartridge or the toner cartridge.

Examples of print failures include a print density thinning due to ink or toner running short or a partial depletion in print due to the clogging of a nozzle in an ink jet type print head, and the like.

According to another aspect of the invention, there is provided a facsimile apparatus including a reception memory that stores data received; a print executing unit that executes printing on a recording sheet on the basis of the data stored in the reception memory; a print-failure determining unit that determines whether there is a possibility that a print failure that includes at least a print density thinning and a partial depletion will occur if the print executing unit performs printing; and a state determining unit that determines whether the present state is a state where effective determination by the print-failure determining unit is possible. If the state determining unit determines that the present state is not the state where effective determination by the print-failure determining unit is possible, a print stopping unit stops execution of printing by the print executing unit. If the state determining unit determines that the present state is not the state where effective determination by the print-failure determining unit is possible, a data retaining unit retains the data stored in the reception memory even after the data has been printed out.

In this facsimile apparatus, if the present state is a state where effective determination by the print-failure determining unit is not possible, for example, if strong light is coming into the determination position in a structure using an optical sensor, then the state determining unit determines that the present state is not a state where effective determination by the print-failure determining unit is possible. In response, the data retaining unit functions to retain the data stored in the reception memory, in an intact form, even after the data has been printed out.

The structure makes it possible to re-print a page that has been printed while it is determined that the state at the time printing occurs is a state where reliable determination by the print-failure determining unit is not possible, on the basis of the data retained by the data retaining unit. In short, even if information has been printed once but not successfully, that information can be extracted later.

The facsimile apparatus according to either of the aspects of the invention may further include a forced print instructing unit that is able to forcibly start printing even if execution of printing is stopped by the print stopping unit. This structure is effective since there can be variation in the determination regarding a print failure so that there can be cases where, although it is determined that there is a possibility of a print failure, printing can be performed without a significant problem. Furthermore, there are cases where printing can be performed without a practical problem in print quality although the present state is a state where effective determination by the print-failure determining unit is not possible.

In such cases, it is possible to determine whether printing can be continued without a practical problem, by checking the page printed immediately before the printing is stopped. If the print quality of the page is sufficiently good, a user may operate the forced print instruction unit to restart printing after the temporary stop. Therefore, this instruction eliminates an inconvenient situation where the apparatus does not allow a user to obtain a printout although printing can actually be performed without a significant problem.

The facsimile apparatus may further include an unnecessary data instructing unit that instructs that data do not need to be retained by the data retaining unit, and a retained-data managing unit which maintains the retaining of data by the data retaining unit until the unnecessary data instructing unit instructs that data do not need to be retained and, which, when the unnecessary data instructing unit instructs so, erases the data retained by the data retaining unit.

Normally, once a legible printout is obtained, the corresponding data in the reception memory is no longer needed and, if retained, can cause a storage space shortage in the reception memory or other problems. With the facsimile apparatus equipped with the unnecessary data instructing unit and the retained-data managing unit, if a document obtained through forced-printing is sufficiently legible, a user may operate the unnecessary data instructing unit, whereby the retained-data managing unit is operated to erase the data retained by the data retaining unit.

If a printout obtained through forced-printing is found to be no good, a user does not operate the unnecessary data instructing unit. Then, the retained-data managing unit maintains the retaining of the data by the data retaining unit until the unnecessary data instructing unit provides an instruction. Therefore, if there is a problem in a printout obtained through forced-printing, it is possible to perform forced-printing again after the cause for the print failure has been removed by, for example, replacing the ink cartridge or the toner cartridge.

BRIEF DESCRIPTION OF THE DRAWINGS

A preferred embodiment of the invention will be described in detail with reference to the following figures wherein.

DETAILED DESCRIPTION OF PREFERRED EMBODIMENTS

A preferred embodiment in which the invention is embodied in a multi-function apparatus will be described in detail hereinafter with reference to the accompanying drawings. The multi-function apparatus refers to an apparatus equipped with various functions, such as a copier, an automatic-answering phone, a telephone, a facsimile, a reader or scanner, a printer and the like. However, the multi-function apparatus according to the embodiment does not need to have all the foregoing functions or may have a function that is not mentioned above. Furthermore, the invention can be applied not only to a multi-function apparatus but also to a facsimile-dedicated machine and the like.

Figure 1:
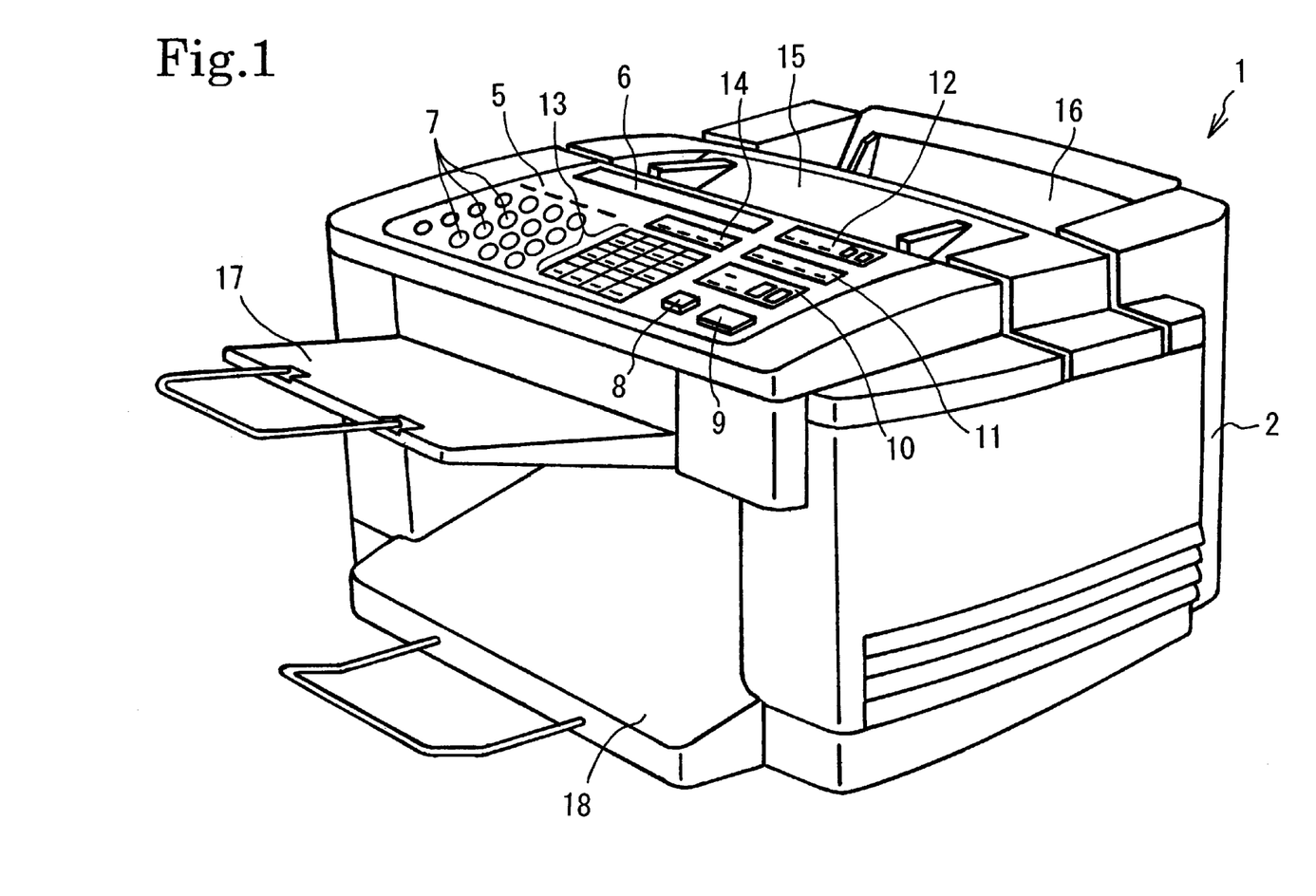
FIG. 1 is an external perspective view of a multi-function apparatus according to a preferred embodiment of the invention.

FIG. 1 is an external perspective view of a multi-function apparatus according to a preferred embodiment of the invention. The multi-function apparatus 1 has an apparatus main body 2 as shown in FIG. 1. The apparatus main body 2 has on its upper surface an operating panel unit 5. Disposed rearward of a leftward portion of the operating panel unit 5 is a liquid crystal display 6, that is, a display device.

More specifically, the operating panel unit 5 has in its leftward portion dial buttons 7 for inputting dial numbers or the like. The dial buttons 7 include number buttons "1" to "0" and, further, an asterisk "*" button and a sharp "#" button and the like. Arranged in a rightward portion of the operating panel unit 5 sequentially from front to rear are a stop key 8 for stopping operation, a start key 9 for starting operation, color copy operating keys 10 for using the multi-function apparatus 1 as a color copier, color printer operating keys 11 for using the multi-function apparatus 1 as a color printer, and answering phone function keys 12 for using the multi-function apparatus 1 as an automatic-answering phone.

Arranged in a central portion of the operating panel unit 5 are one-touch dial keys 13 for facilitating the dialing operations, and facsimile operating keys 14 for using the multi-function apparatus 1 as a facsimile apparatus. Using the proper keys from among the keys 7, 8, 9, 10, 11, 12, 13 and 14, a user can operate the multi-function apparatus 1 for a desired function.

A document tray portion 15 for placing a stack of documents that are to be serially fed and read is provided at a rearward position in the operating panel unit 5. Provided rearward of the document tray portion 15 is a sheet feeder portion 16 for holding a stack of recording sheets that are to be fed for recording.

A document stacker 17 for supporting a stack of documents that have been serially scanned or read and discharged is disposed at the front of the multi-function apparatus 1. Disposed under the document stacker 17 is a recorded sheet stacker 18 for supporting a stack of recorded sheets that have been serially discharged.

Figure 2:
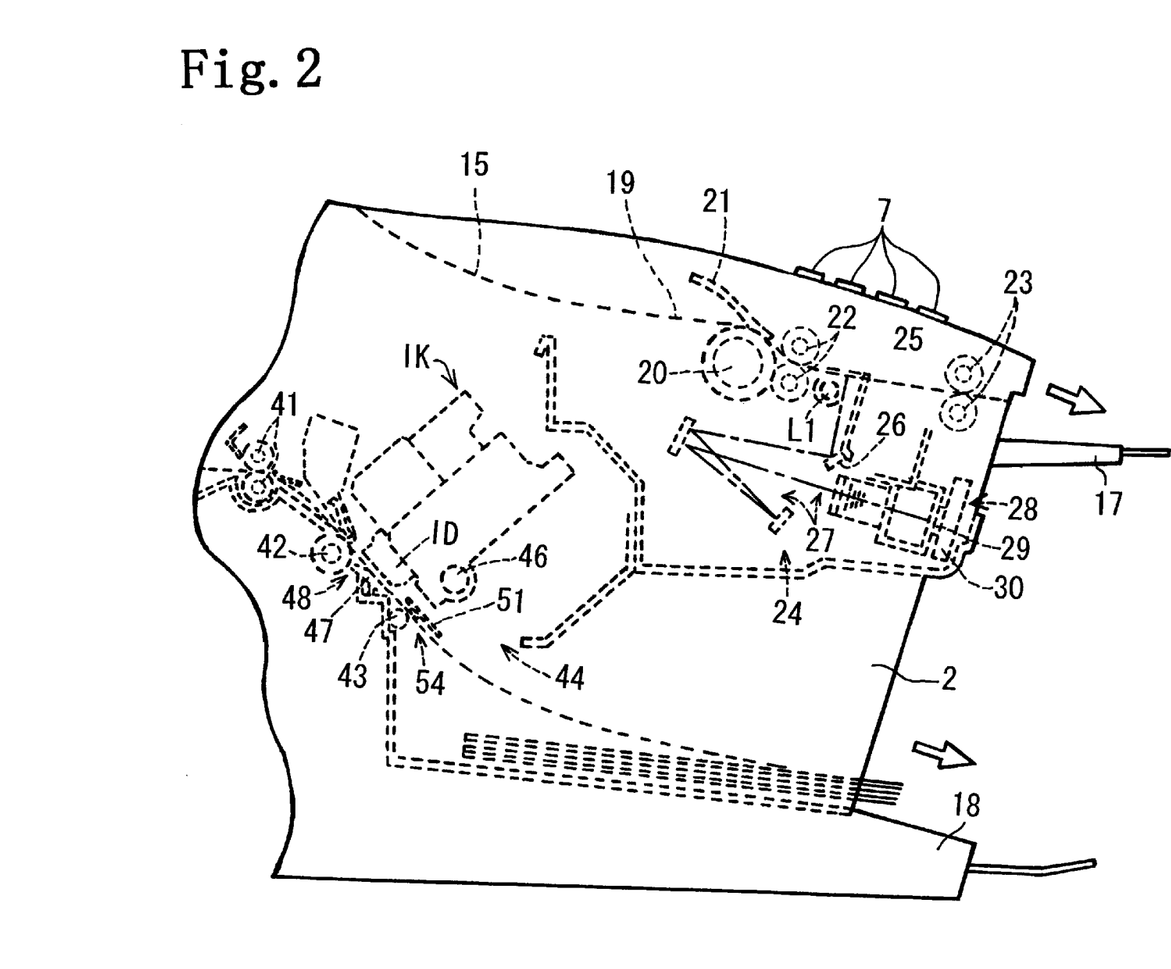
FIG. 2 is a side view of portions of the multi-function apparatus shown in FIG. 1.

As shown in FIG. 2, a document sheet to be conveyed from the document tray portion 15 to the document stacker 17 is conveyed inside the apparatus main body 2 of the multi-function apparatus 1, that is, along a guide passage 19 formed under the operating panel unit 5. More specifically, disposed along the guide passage 19, below the operating panel unit 5, are a document sheet separating roller 20 and a separator piece 21 that faces and contacts the document sheet separating roller 20. Disposed downstream of the document sheet separating roller 20 are a pair of upper and lower guide rollers 22. Disposed downstream of the guide rollers 22 are another pair of upper and lower guide rollers 23. The guide rollers 23 are disposed near the document stacker 17. In this arrangement, the document sheet separating roller 20, cooperating with the separator piece 21, separates a document sheet, one sheet at a time, from a stack of document sheets placed on the document tray portion 15, so that the separated sheet is conveyed downstream by the guide rollers 22, 23 while being provided with tension by the guide rollers 22, 23. While being conveyed downstream, the document is read by a reader, or scanner, device 24 that is disposed forward inside the apparatus main body 2.

A reading position 25 is defined between the guide rollers 22, 23. Image information is read from a document surface at the reading position 25 by the reader device 24, that is, a photoelectric converter element. The reader device 24 comprises a lamp L1 provided as a light source, a first reflecting mirror 26, an optical system 27 including a plurality of reflecting mirrors, and a CCD unit 28. The CCD unit 28 is formed by a base board 30 where a CCD 29 is packaged.

In this arrangement, a document conveyed along the guide passage 19 is irradiated at the reading position 25 by the lamp L1. Light reflected from the document surface is inputted to the CCD 29, via the reflecting mirror 26 and the optical system 27. The base board packaged with the CCD 29 is disposed in an upper portion of the apparatus main body 2, so that the reader device 24 (the CCD unit 28) is disposed in an upper portion of the apparatus main body 2. Therefore, the handling of documents is facilitated.

A printing mechanism IK is disposed rearward of the reader device 24, inside the apparatus main body 2. The printing mechanism IK has ink cartridges respectively containing cyan (C), magenta (M), yellow (Y) and black (K) inks, and an ink jet head ID for recording a color image on a recording sheet conveyed from the sheet feeder portion 16. The ink jet head ID is a serial print type that records a color image on a recording sheet by a serial method. That is, the ink jet head ID records one line of a color image on a recording sheet by moving in a right-to-left direction in the apparatus main body 2 and, after the document is conveyed for the next line, the ink jet head ID records the line of the color image.

Figure 3:
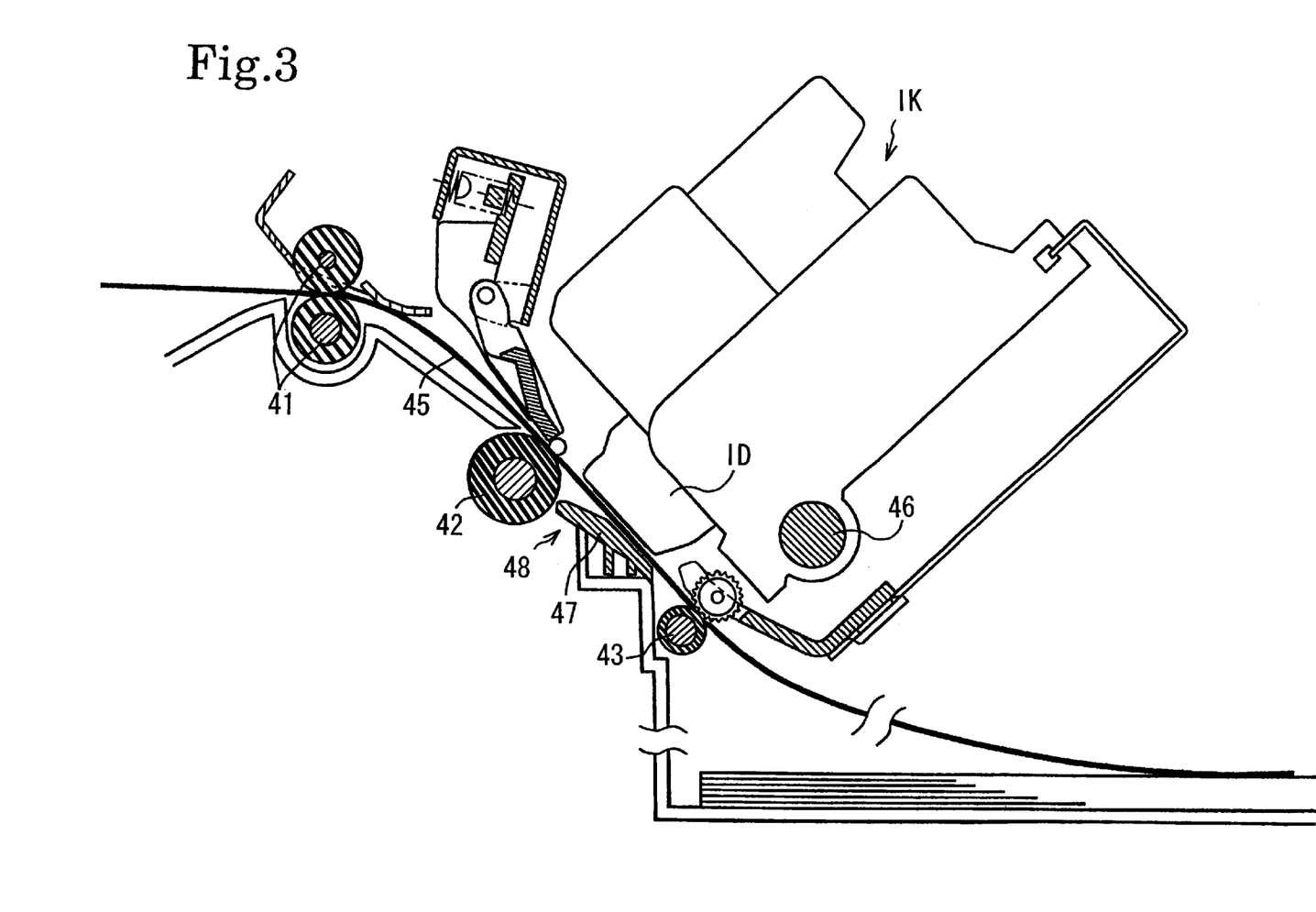
FIG. 3 is a sectional view of portions of the multi-function apparatus shown in FIG. 1.

From a stack of recording sheets (not used for recording) placed on the sheet feeder portion 16, sheet feed rollers 41, 42, 43 convey a recording sheet, one sheet at a time, along a predetermined conveyance passage 45 to the recorded sheet stacker 18, as shown in FIGS. 2 and 3. A platen 47 is disposed facing the inkjet head ID of the printing mechanism IK and extending along a carriage bar 46. When a recording sheet is conveyed to a printing position 48 set on the platen 47, printing is performed on the recording sheet by the serial printing function of the printing mechanism IK. When the multi-function apparatus 1 functions as a printer or a copier, color printing is performed. When the multi-function apparatus 1 performs a facsimile function, monochrome printing is performed.

Figure 4:
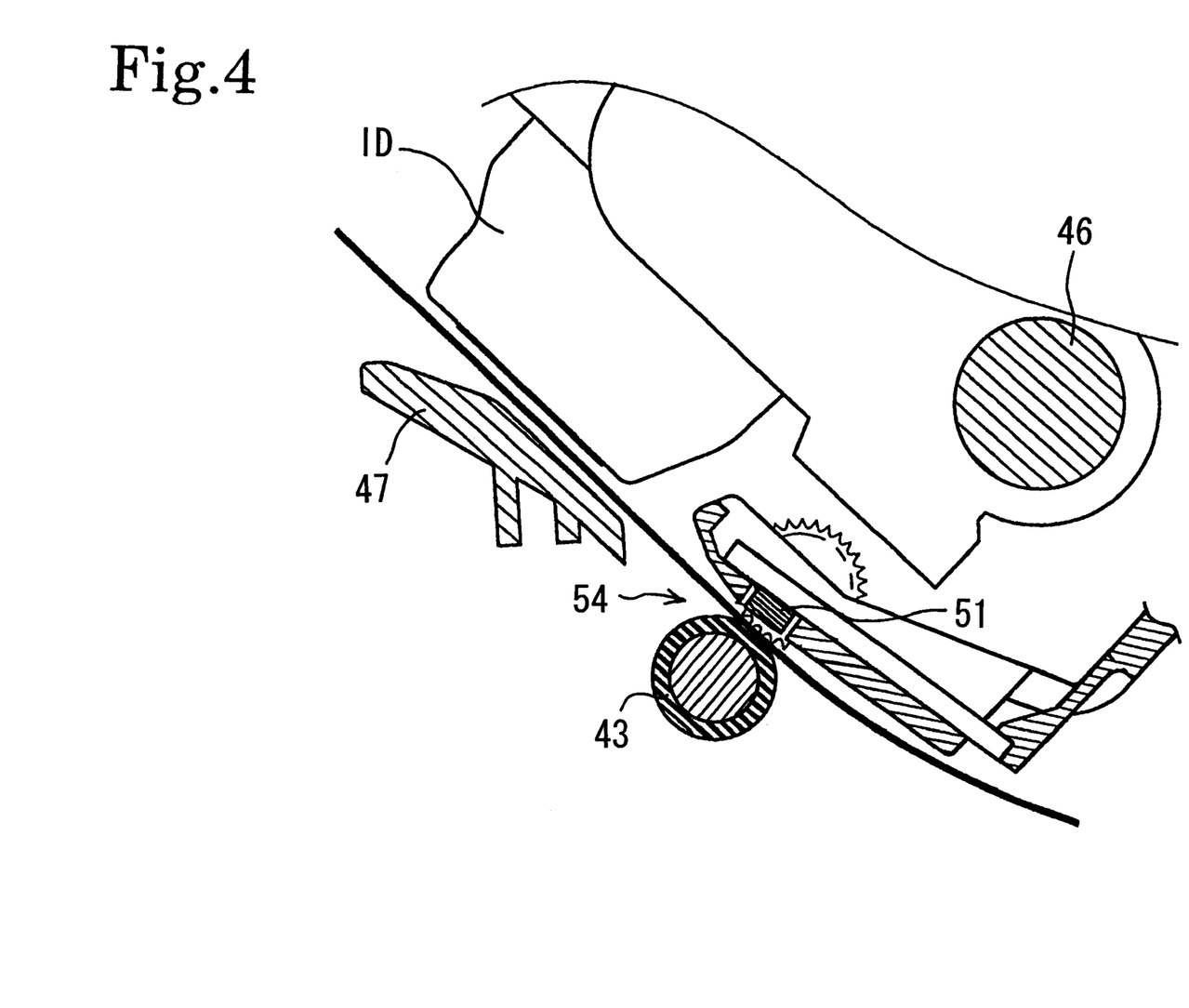
FIG. 4 is a sectional view of portions of the multi-function apparatus.

In this embodiment, a reflection type sensor 51 is disposed at a position facing the shaft of the sheet feed roller that is disposed furthest downstream, that is, nearest to the sheet discharge opening 44 among the sheet feed rollers 41–43, as shown in FIGS. 2 and 4. The reflection type sensor 51 has a light emitting element (LED) and a light receiving element. The reflection type sensor 51 is provided for acquiring, for example, data that are used in an ink shortage determining operation and a paper jam determining operation, and the like, to be described below.

Figure 5:
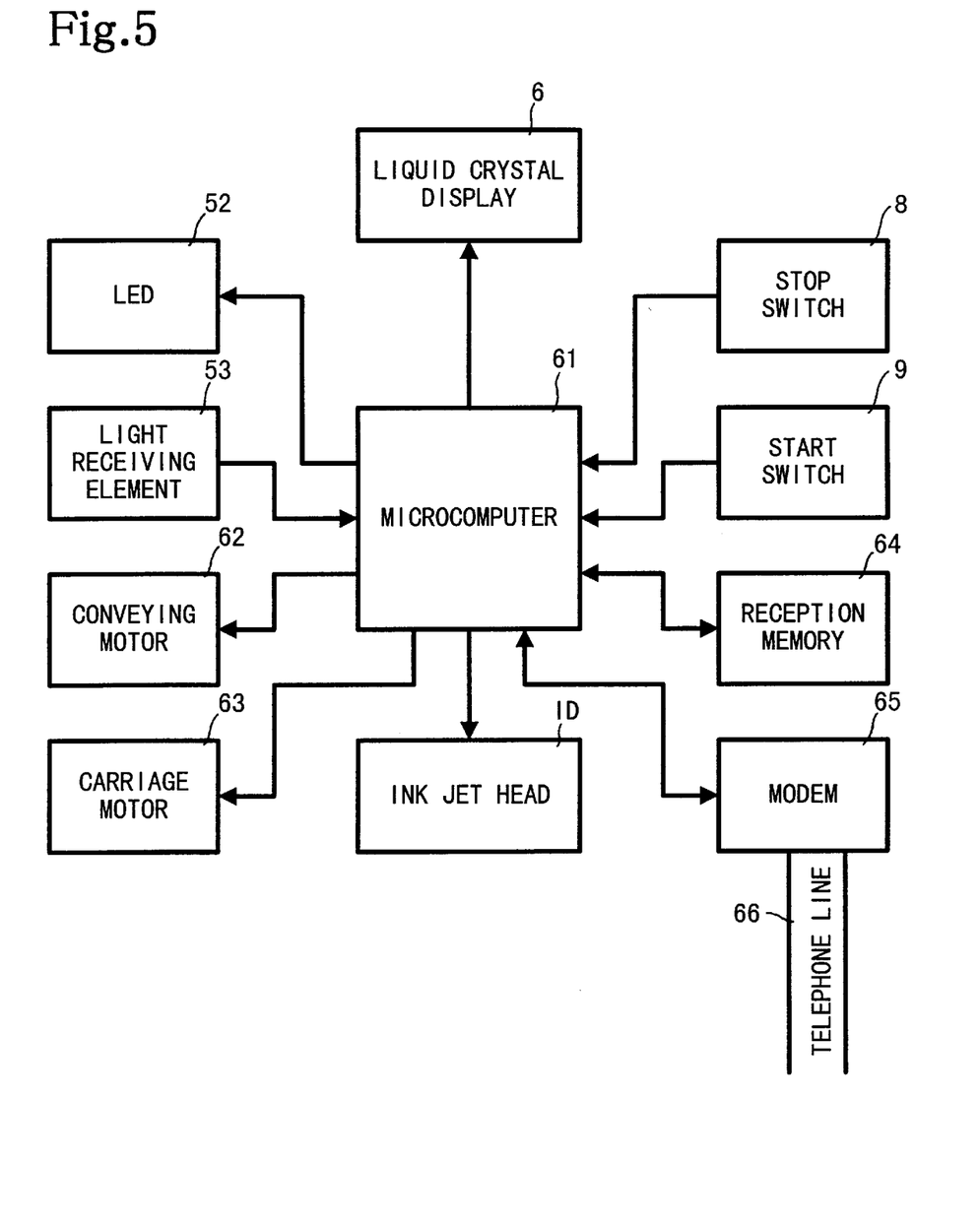
FIG. 5 is a block diagram of a control system of the facsimile function of the multi-function apparatus.

As shown in FIG. 5, a control system of the facsimile system mainly comprises a microcomputer 61 having a CPU, a ROM, a RAM and the like, the liquid crystal display 6, the stop switch 8, the start switch 9, the ink jet head ID, the LED 52 and the light receiving element 53 of the reflection type sensor 51, a conveying motor 62, a carriage motor 63, a reception memory 64, a modem 65 and a telephone line 66.

Figure 6:
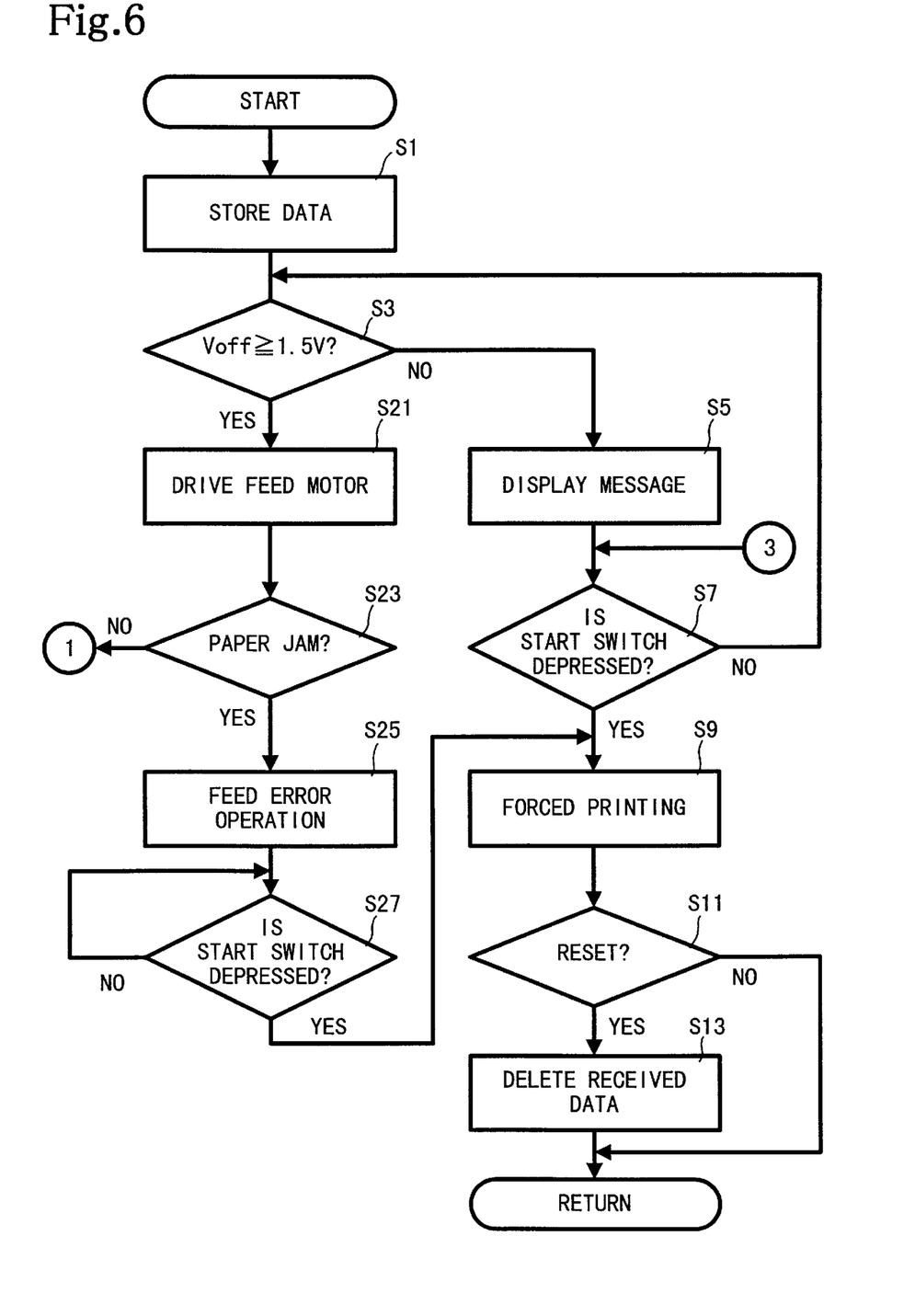
FIG. 6 is a flowchart illustrating operations of the facsimile function according to the preferred embodiment.

The operation of the control system for the facsimile function will be described with reference to the flowcharts of FIGS. 6 to 8. When facsimile data is received via the telephone line 66 and the modem 65, the control system temporarily stores the data into the reception memory 64 in step S1 shown in FIG. 6. When the storing of print data into the reception memory 64 is completed, the control system inputs a detection signal Qoff that is outputted from the light receiving element 53 when the LED 52 is off, and determines whether the detection voltage Voff when the LED 52 is off is equal to or greater than 1.5 V, in step S3. In this embodiment, the multi-function apparatus 1 adopts a structure in which the sheet feed roller 43 has a black surface and the paper jam detection (described below) is performed using the black surface of the sheet feed roller 43. Therefore, a design has been made such that the detection voltage Voff outputted when the LED 52 is off becomes a black level (=5 V) if there is no light coming from outside. The reflection type sensor 51 according to this embodiment is designed to output a white level (=1 V). The dynamic range thereof becomes 4 V if there is no deterioration over time or the like.

If Voff<1.5 V (NO in step S3), it indicates that the external light is too strong to perform the paper jam determination or the ink shortage determination, which need to be performed before printing. Therefore, the control system does not start a printing operation but displays a message "RECEIVED . . . " on the liquid crystal display 6 in step S5. The message displayed on the liquid crystal display 6 indicates to a user that there is received data that has not been printed. Subsequently in step S7, the control system waits for the start switch 9 to be operated by a user. When the start switch 9 is depressed (YES in step S7), which means that a forced print instruction is made, the control system performs forced printing in step S9. Although a typical facsimile apparatus is designed to erase received data after the data is printed out, the multi-function apparatus 1 of this embodiment is designed to retain the print data stored in the reception memory 64 even after the forced printing. After the forced printing in step S9, the control system determines in step S11 whether a predetermined reset instruction is made by, for example, simultaneously depressing the start switch 9 and the stop switch 8. If the reset instruction is made (YES in step S11), the control system deletes from the reception memory 64 the received data that has been printed out, in step S13.

If it is determined in step S3 that Voff≧1.5 V (YES in step S3), the control system drives the conveying motor 62 in step S21 so that a recording sheet is conveyed from the sheet feeder portion 16 toward the printing position 48. Subsequently in step S23, it is determined whether a paper jam has occurred. If a paper jam has occurred (YES in step S23), the control system performs the sheet feed error operation in step S25.

In the paper jam determination in step S23, the control system turns on the LED 52 and inputs a detection signal Qon from the light receiving element 53, and determines whether the detection signal Qon when the LED 52 decreases by at least a predetermined amount. Based on this determination, the control system determines whether a paper jam has occurred. More specifically, if there is no decrease in the detection signal Qon equal to or greater than the predetermined amount over a preset length of time T0, it is determined that a paper jam has occurred.

In the sheet feed error operation of step S25, the control system stops the conveying motor 62 and displays a message "PAPER FEED ERROR" on the liquid crystal display 6. Subsequently in step S27, the control system waits for the start switch 9 to be depressed after a user removes the jammed recording sheet.

Figure 7:
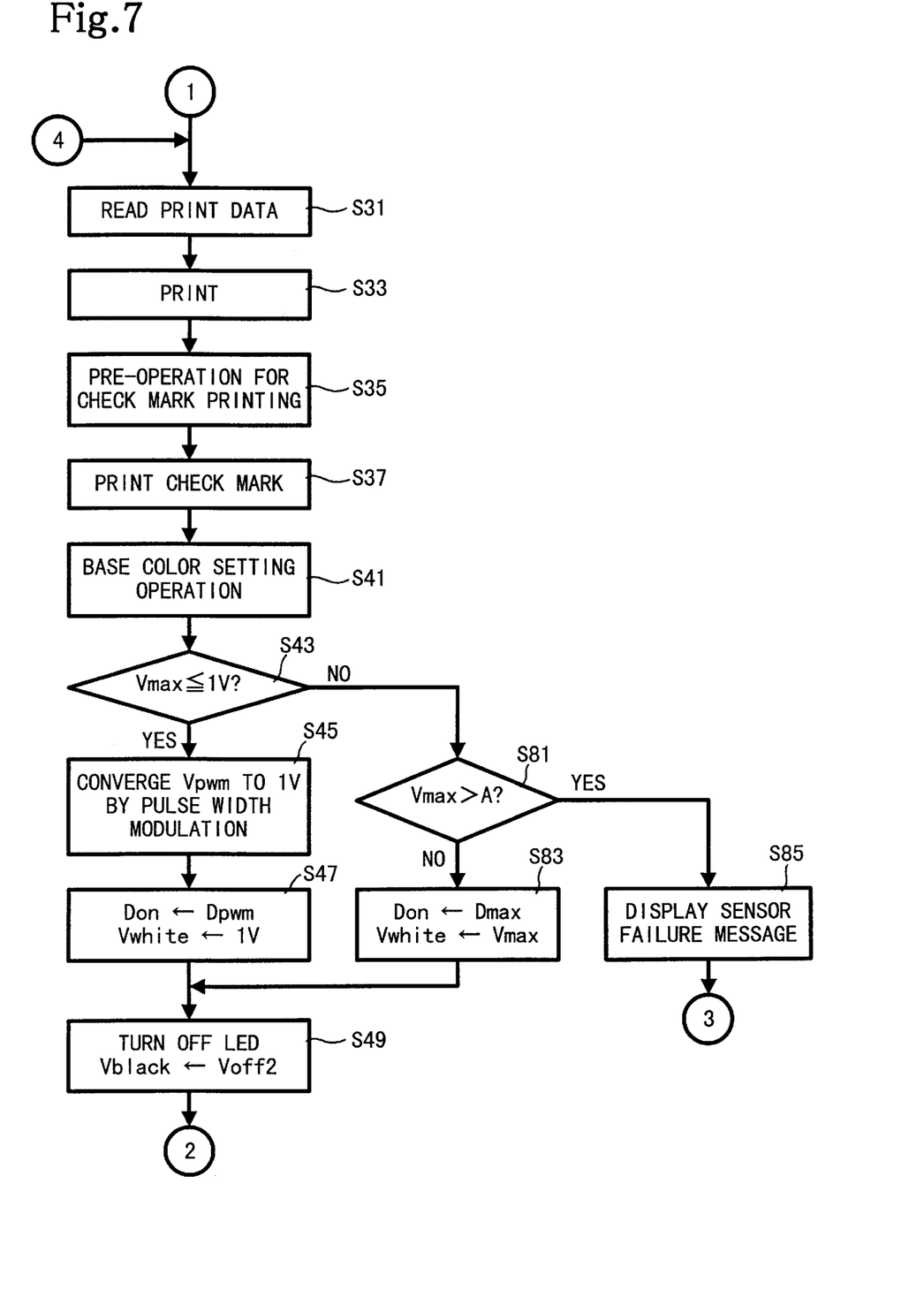
FIG. 7 is a flowchart illustrating the operations of the facsimile function, continuing from the flowchart of FIG. 6.
Figure 8:
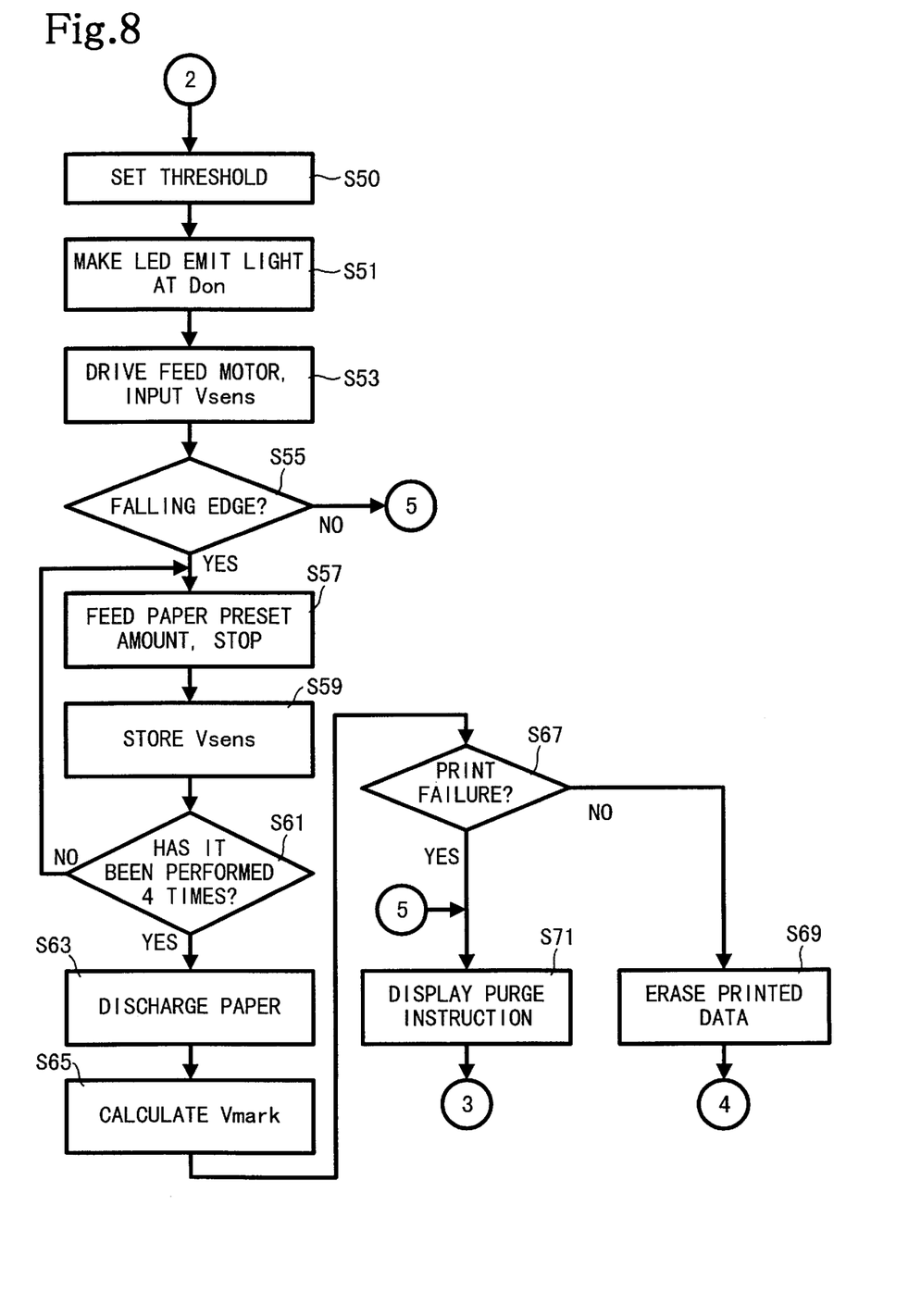
FIG. 8 is a flowchart illustrating the operations of the facsimile function, continuing from the flowchart of FIG. 7.

If sheet feed is performed normally (NO in step S23), the control system reads print data from the reception memory 64 in step S31 shown in FIG. 7. Subsequently in step S33, the control system performs printing by driving the conveying motor 62, the carriage motor 63 and the ink jet head ID. After one page of printing is completed, the control system performs in step S35 a pre-operation for check mark printing. More specifically, the conveying motor 62 is operated and stopped so that a predetermined position (indicated by 73 in FIG. 9) rearward of a print area 72 (in FIG. 9) on the recording sheet comes to the printing position 48.

Figure 9:
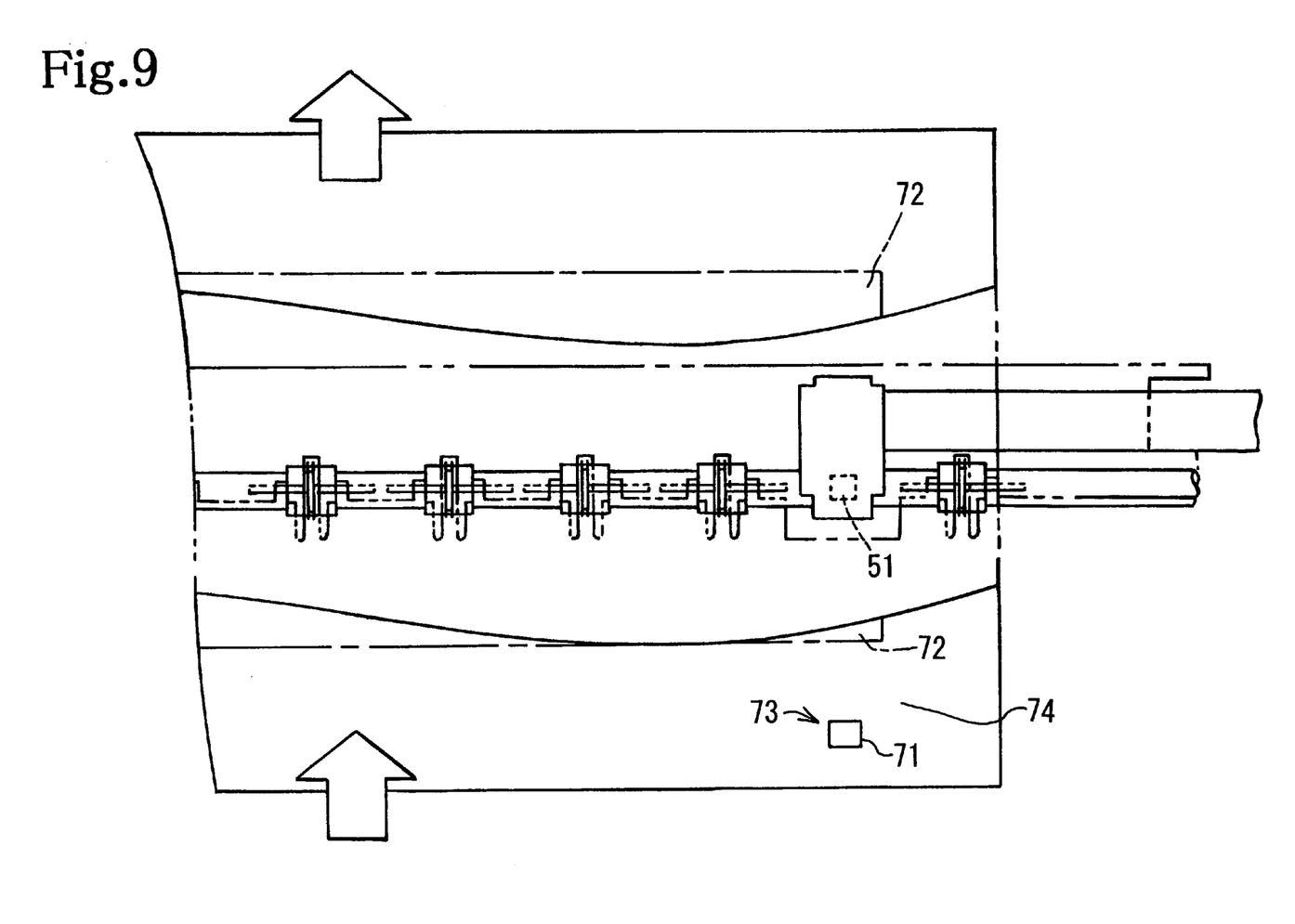
FIG. 9 is a plan view of portions of the multi-function apparatus, illustrating how a check mark is printed according to the preferred embodiment.

Subsequently in step S37, the control system prints a check mark 71 as indicated in FIG. 9 by driving the ink jet head ID and the carriage motor 63. In the operation of step S37, the control system applies to the inkjet head ID a drive signal such that all the ink jet nozzles eject ink. While this ink ejecting status is maintained, the carriage motor 63 is operated by a predetermined amount so that the ink jet head ID is moved a predetermined distance in the right-to-left direction. Thereby, a solid square check mark 71 as indicated in FIG. 9 is printed if the multi-function apparatus 1 is in a normal state, that is, if there is not any ink shortage or any other problem concerned.

After the printing of the check mark 71 is completed, the control system executes a base color setting operation in step S41. More specifically, the control system operates the conveying motor 62 by a predetermined amount so as to set the recording sheet at a predetermined position at which a base color portion 74 present between the print area 72 and the check mark print position 73 comes to a detection position 54 (FIGS. 2 and 4) that faces the light receiving element 53 (FIG. 4).

Subsequently in step S43, the control system causes the LED 52 to emit at a duty of 100% so that the maximum amount of light is obtained, and determines whether the detection voltage Vmax of the light receiving element 53 thereby obtained is equal to or less than 1 V. If Vmax≦1 V (YES in step S43), the control system adjusts the amount of light by performing pulse width modulation (PWM control) on the LED 52, so as to converge the detection voltage Vpwm to 1 V in step S45. Subsequently in step S46, the control system sets the duty ratio Dpwm at the time of convergence of the detection voltage Vpwm to 1 V as a control value Don for the LED 52, and sets the white level voltage Vwhite=1 V. Thereby, the control system adjusts the light receiving element 53 to an output status such that the base color of the recording sheet being presently used becomes the white level.

Subsequently in step S49, the control system turns off the LED 52, and stores the present detection voltage Voff2 of the light receiving element 53 as a voltage Vblack corresponding to the black level. In step 50 in FIG. 8, the control system determines a threshold value based on the actual dynamic range (=Vblack−Vwhite) as follows:

(threshold value)=(Vblack−Vwhite)×CNST.+Vwhite  (1)

where CONST. is a constant less than 1; in this embodiment, CONST. =0.7.

Subsequently in step S51, the control system causes the LED 52 to emit light at Don=Dpwm set in step S47. In step S53, the control system inputs a detection voltage Vsens from the light receiving element 53 while further operating the conveying motor 62 to convey the recording sheet toward the discharge opening 44. In step S55, the control system determines whether there is a predetermined falling edge in the detection voltage Vsens while the recording sheet is being conveyed by a preset amount. If the predetermined falling edge is not detected in the detection voltage Vsens (NO in step S55), the control system jumps to step S71.

Conversely, if the predetermined falling edge is detected in step S55 (YES), the control system operates the conveying motor 62 by a predetermined amount from the position at the time of the detection, and temporarily stops operating the conveying motor 62 in step S57, and then stores the present detection voltage Vsens into the RAM in step S59. In step S61, it is determined whether the operation of steps S57 and S59 has been repeatedly performed four times. When the operation of steps S57 and S59 has been performed four times (YES in step S61), the control system further operates the conveying motor 62 to discharge the recording sheet to the recorded sheet stacker 18 in step S63. Subsequently in step S65, the control system calculates a mean value of the four values of the detection voltage Vsens stored in step S59, thereby obtaining a detection voltage Vmark corresponding to the check mark 71. Then in step S67, the control system determines whether a print failure has occurred due to ink shortage or the like, based on the following expressions:

Print failure:

Vmark<(threshold)  (2)

Good print:

Vmark≦(threshold)  (3)

If it is determined in step S67 that a print failure has occurred (YES), the control system displays on the liquid crystal display 6 a message "PURGE INSTRUCTION" in step S71 to indicate that purge of the ink jet head ID needs to be performed. In this operation, the data stored in the reception memory, including the data for the printed page, are not erased but retained, as in the case of the operation in steps S3 to S5. If it is determined that there is no print failure occurring (NO in step S67), the control system erases the received data for the page in step S69. Subsequently the control system jumps to step S31, in order to perform the printing of the next page.

If it is determined that a print failure has occurred (YES in step S67), the control system proceeds to step S71 and then to step S7, where the control system waits for the start switch 9 to be depressed. After the start switch 9 is depressed, the control system performs forced printing in step S9. As described above, the print data stored in the reception memory 64 is not deleted until the predetermined reset instruction is given (steps S11 and S13).

If it is determined in step S43 that Vmax>1 V (NO in step S43), the control system determines in step S81 whether Vmax is greater than a threshold value A that is greater than 1 V. The threshold value A is preset to a value that is relatively close to the black level in contrast to 1 V, which is obtained as the white level in the normal state, for example, A=2.5×V, A=0.7×Vblack (where Vblack is the value stored in step S49 although the default value of Vblack is 5 V), or the like. In other words, the threshold value A is preset to a value such that if Vmax is greater than the threshold value A, it can be determined that the Vmax is significantly close to the black level.

If it is determined in step S81 that Vmax≦A (NO in step S81), the control system sets Don=Dmax and Vwhite=Vmax in step S83, and then goes to step S49. Conversely, if it is determined that Vmax>A (YES in step S81), the control system displays "SENSOR FAILURE" on the liquid crystal display 6 in step S85, and then jumps to step S7. Thereby, the printing of subsequent pages is stopped. The printing operation needs to be stopped in this case because if the detection voltage Vmax obtained when LED 52 emits the maximum amount of light is excessively close to the black level (Vmax>A), it means that the dynamic range obtained will be insufficient so that the determination in step S55 or step S67 may not be properly performed. The cause for occurrence of such a sensor error state can be, for example, an ink-stained light receiving surface of the light receiving element 53, or the like.

In the multi-function apparatus 1 of the embodiment as described above, after printing out facsimile data on a recording sheet, the control system prints the check mark 71, which forms a solid square in a normal state, at a position a predetermined distance rearward from the print area, by causing all the nozzles of the ink jet head ID to eject ink (steps S35 and S37). Based on the light reflected from the check mark 71, the control system determines whether there is a print failure (step S67). In the embodiment, if ink is running out (ink shortage), the color or tone of the entire check mark 71 becomes thin so that the expression (2), that is, Vmark<(threshold), holds. Therefore, a print failure caused by an ink shortage can be reliably detected. If ink is not running out but an ink jet nozzle is clogged, a partial depletion occurs in the check mark 71, so that the intensity of the light reflected from the entire check mark 71 decreases. Therefore, the expression (2) also holds, thereby reliably detecting a print failure. Consequently, this embodiment highly reliably detects print failures caused by ink shortage and, moreover, print failures caused by ink jet nozzle clogging, which is a problem characteristic of ink jet heads.

For the determination regarding print failures as described above, this embodiment sets the base color portion 74 of a recording sheet to the detecting position 54, and adjusts the amount of light emission from the LED 52 to establish (sheet base color)=(white level) by performing pulse width modulation on the LED 52, and sets the duty ratio Dpwm that establishes (sheet base color)=(white level), as a control value Don, and determines an operating black level Vblack based on the detection voltage occurring when the LED 52 is off (steps S41 through S49). Then, the multi-function apparatus 1 of the embodiment determines an actual dynamic range (Vblack−Vwhite) taking into account the base color of a recording sheet and the conditions during operation. Based on the actual dynamic range, the multi-function apparatus 1 determines a threshold value for determination as to whether there is a print failure. Therefore, even if the recording sheet being used is a recycled paper sheet that is gray or brownish in color, the multi-function apparatus 1 is able to reliably determine whether there is a print failure. Furthermore, if there is external light coming into the detecting position, the multi-function apparatus 1 can overcome the effect of such external light and make a reliable determination regarding print failures.

Moreover, since the base color portion 74 used for the aforementioned adjustment is not near the leading edge of the recording sheet but between the printing position of the check mark 71 and the print area 72 (near the tailing edge), the sheet discharge opening is substantially closed by a forward portion of the recording sheet so that the detecting position 54 is shielded from external light to a significant extent, during the aforementioned operations for determining the actual dynamic range. Therefore, it is possible to determine a precise dynamic range without being considerably affected by external light.

If the detection voltage Voff outputted from the light receiving element 53 when the LED 52 is off is very close to the white level (1 V), the multi-function apparatus 1 of the embodiment does not perform printing but displays a message indicating received data (steps S3 and S5). For example, the multi-function apparatus 1 merely displays the message "RECEIVED . . . " and holds the print operation if the multi-function apparatus 1 is in a state where the determination regarding a paper jam or print quality deterioration is not possible due to, for example, in-coming strong external light, as in the cases of strong morning sun light coming into the interior of an multi-function apparatus 1 if it is placed near an east-side window, strong afternoon sun light if the apparatus is placed near a west-side window, or strong noon sun light in winter if the apparatus is placed near a south-side window. In short, the multi-function apparatus 1 avoids performing the determination regarding print failures and holds the printing operation when a reliable print-failure determination is impossible, thereby preventing an event where printing is performed while a print failure is missed. Further, because the multi-function apparatus 1 displays the message "RECEIVED . . . " as described above, the multi-function apparatus 1 can advantageously inform a user that there is data that is not yet printed out, so that the user becomes certain that the received data is not automatically or immediately printed out.

With regard to a sensor deterioration, the multi-function apparatus 1 also makes a precise determination based on a detection voltage outputted when the LED 52 is caused to emit the maximum amount of light (steps S43 and S81). Therefore, the multi-function apparatus 1 avoids making a false determination that there is no print failure despite an actual print failure and, therefore, prevents valuable received data from being lost.

In both a case where it can be determined that an error has occurred and a case where it can be determined that an error is about to occur, it is possible to instruct the multi-function apparatus 1 to perform printing by using the forced printing function provided in the embodiment. Therefore, the multi-function apparatus 1 eliminates an inconvenient situation where a printout cannot be obtained even through the present print failure is a minor failure that allows practically acceptable print quality.

Furthermore, the multi-function apparatus 1 retains the data in the reception memory until the reset operation is performed even after the forced printing is performed. Therefore, even if a printout obtained through the forced printing is found to be illegible, the data is still in storage as long as the reset instruction is not made. Consequently, the multi-function apparatus 1 is able to perform the forced printing again after the cause for the present print failure has been removed by performing a purge or the like, thereby preventing valuable received data from being lost. Thus, the multi-function apparatus 1 eliminates an inconvenient situation where a user becomes uncertain who sent the information to the apparatus or what information has been sent.

The multi-function apparatus 1 of the embodiment makes it possible for a user to intentionally erase the received data after printing by inputting the predetermined reset instruction. Normally, once a legible printout is obtained, the corresponding data in the reception memory is no longer needed and, if retained, can cause a storage space shortage in the reception memory.

From the foregoing embodiment, various technical summary concepts include:

(A1) A printing apparatus including a sheet conveying device that conveys a recording sheet along a conveyance passage from a feeder device to a discharge opening; an ink jet-type print head disposed at a print position in the conveyance passage and having a plurality of nozzles; a print executing device that performs printing on the recording sheet by driving the print head and the sheet conveying device on the basis of print data inputted from an external device; a check mark printing device that, after the print executing device has performed printing, prints a check mark at a position on the recording sheet that is a predetermined distance rearward from a print area on the recording sheet, by driving the sheet conveying device so as to further convey the recording sheet in the discharge direction and by driving the ink jet-type print head so as to eject ink from all the nozzles; a reflection-type sensor provided at a detecting position defined between the print position and the discharge opening and having a light emitting element and a light receiving element; and a print-failure determining device which causes the light emitting element to emit light when the check mark is at the detecting position, and which compares a detection signal outputted from the light receiving element when the light emitting element is thus caused to emit light, with a threshold calculated from a dynamic range of the reflection-type sensor, and which determines that there is a print failure if the detection signal is closer to a white level than the threshold is close to the white level.

(A2) A printing apparatus based on the printing apparatus just described that further includes a light amount determining device which, when a base color portion of the recording sheet is at the detecting position with respect to the reflection-type sensor, adjusts the amount of light emitted by the light emitting element so that the detection signal from the light receiving element converges to a targeted white level signal, and which determines an amount of light from the light emitting element in accordance with a result of the adjustment.

(A3) A printing apparatus based on the printing apparatus of paragraph (A1), further including an actual dynamic range detector device which stops light emission by the light emitting element when the base color portion of the recording sheet is at the detecting position regarding the reflection-type sensor, and which sets, as a black level, the detection signal outputted from the light receiving element when the light emission by the light emitting element is thus stopped, and which sets, as a white level, the detection signal outputted from the light receiving element when the light emitting element is caused to emit light, and which detects an actual dynamic range based on the black level and the white level; and a threshold value determining device that determines a value of the threshold for the determination by the print-failure determining device, taking into account the actual dynamic range detected by the actual dynamic range detector device.

(A4) A printing apparatus based on the printing apparatus of paragraph (A2) further including an actual dynamic range detector device which stops light emission by the light emitting element when the base color portion of the recording sheet is at the detecting position regarding the reflection-type sensor, and which sets, as a black level, the detection signal outputted from the light receiving element when the light emission by the light emitting element is thus stopped, and which sets, as a white level, the detection signal outputted from the light receiving element when the light emitting element is caused to emit the amount of light determined by the light amount determining device, and which detects an actual dynamic range based on the black level and the white level; and a threshold value determining device that determines a value of the threshold for the determination by the print-failure determining device, taking into account the actual dynamic range detected by the actual dynamic range detector device.

(A5) A printing apparatus based on any one of the printing apparatuses described in paragraphs (A2)–(A4) further including a base color correction conveying device that conveys the recording sheet to set a portion of the recording sheet defined between the data print area and the print position of the check mark, which portion is regarded as a base color portion of the recording sheet, to the detecting position regarding the reflection-type sensor.

(B1) A printing apparatus including a sheet conveying device that conveys a recording sheet along a conveyance passage from a feeder device to a discharge opening; an ink jet-type print head disposed at a print position in the conveyance passage; a print executing device that performs printing on the recording sheet by driving the print head and the sheet conveying device on the basis of print data inputted from an external device; a reflection-type sensor provided at a detecting position defined between the print position and the discharge opening and having a light emitting element and a light receiving element; a print-failure determining device that determines whether there is a print failure on the basis of a detection signal outputted by the light receiving element of the reflection-type sensor when the light emitting element is caused to emit light; a print stopping device that stops the execution of printing by the print executing device if the print-failure determining device determines that there is a print failure; a reliability determining device that determines that the present state is a state where the determination by the print-failure determining device is not reliable if the detection signal, outputted by the light receiving element when the light emission by the light emitting element is stopped, is closer to the detection signal corresponding to the white level than a predetermined value is close to the detection signal corresponding to the white level; and a determination impossible-state print stopping device that stops the execution of printing by the print executing device if the reliability determining device determines that the present state is a state where the determination by the print-failure determining device is not reliable.

(B2) A printing apparatus based on the printing apparatus of paragraph (B1) further including a message display device that, when the determination impossible-state print stopping device is operated, displays a message indicating that data that has not been printed out is stored.

(B3) A printing apparatus based on the printing apparatus of paragraph (B2) further including a forced print instructing device that, if printing is stopped while data that has not been printed out is stored, is able to output an instruction to forcibly start printing.

(C1) A printing apparatus including a sheet conveying device that conveys a recording sheet along a conveyance passage from a feeder device to a discharge opening; an ink jet-type print head disposed at a print position in the conveyance passage and having a plurality of nozzles; a print executing device that performs printing on the recording sheet by driving the print head and the sheet conveying device on the basis of print data inputted from an external device; a check mark printing device that, after the print executing device has performed printing, prints a check mark at a position on the recording sheet that is a predetermined distance rearward from a print area on the recording sheet, by driving the sheet conveying device so as to further convey the recording sheet in the discharge direction and by driving the ink jet-type print head so as to eject ink from all the nozzles; a reflection-type sensor provided at a detecting position defined between the print position and the discharge opening and having a light emitting element and a light receiving element; a print-failure determining device which causes the light emitting element to emit light, when the check mark is at the detecting position, and which determines whether there is a print failure on the basis of a detection signal outputted by the light receiving element when the light emitting element is thus caused to emit light; a sensor failure determining device which causes the light emitting element to emit the maximum amount of light, when a base color portion of the recording sheet is at the detecting position regarding the reflection-type sensor, and which determines that there is a sensor failure if the detection signal outputted by the light receiving element, when the light emitting element is thus caused to emit the maximum amount of light, is closer to a black level than a predetermined value greater than a white level is close to the black level; and a message display device that displays a predetermined message if the sensor failure determining device determines that there is a sensor failure.

(C2) A printing apparatus based on the printing apparatus of paragraph (C1) further including a base color portion setting device that conveys the recording sheet to set a portion of the recording sheet defined between the data print area and the print position of the check mark, which portion is regarded as a base color portion of the recording sheet, to the detecting position regarding the reflection-type sensor.

(C3) A printing apparatus based on the printing apparatus of either paragraph (C1) or (C2) further including a sensor failure-state print stopping device that stops the printing of the next page from being performed by the print executing device if the sensor failure determining device determines that there is a sensor failure; and a print restarting device that is able to forcibly restart the printing if the sensor failure-state print stopping device has stopped the printing.

(C4) A printing apparatus based on the printing apparatus of paragraph (C3), further including a previous page data storing device that stores the print data of the previous page if the sensor failure determining device determines that there is a sensor failure.

As is apparent from the foregoing description, the facsimile apparatus of the invention retains received data if there is a print failure or the possibility of an occurrence of a print failure. Therefore, the facsimile apparatus of the invention eliminates the situation where the content of received data becomes incomprehensible or unidentifiable.

While the preferred embodiment of the invention is described above, it is to be understood that the invention is not restricted to the particular forms shown in the foregoing embodiment. Various modifications and alterations can be made thereto without departing from the scope of the invention.

What is claimed is:

1. A facsimile apparatus, comprising:
   a reception memory that stores data received;
   a print executing unit that executes printing on a recording sheet on the basis of the data stored in the reception memory;
   a print-failure determining unit that determines whether there is a possibility of a print failure, the print failure including at least one of a print density thinning and a partial depletion, will occur if the print executing unit performs printing;
   a print stopping unit that stops execution of printing by the print executing unit if the print-failure determining unit determines that there is a possibility of a print failure;
   an effectiveness determination unit that determines whether the print-failure determining unit is operating properly, the print-failure determining unit determining whether there is a possibility of a print failure only when the effectiveness determination unit determines that the print-failure determining unit is operating properly;
   a data retaining unit that retains the data stored in the reception memory even after the data has been printed out when either the effectiveness determination unit determines that the print-failure determining unit is not operating properly or the print-failure determining unit determines that there is a possibility of a print failure; and
   a data deleting unit that deletes the data stored in the reception memory after the data has been printed out when the print-failure determining unit determines that there is not a possibility of print failure.

2. The facsimile apparatus according to claim 1, further comprising a forced print instructing unit that is able to forcibly start printing even if execution of printing is stopped by the print stopping unit.

3. The facsimile apparatus according to claim 2, further comprising:
   an unnecessary data instructing unit that instructs that data do not need to be retained by the data retaining unit; and
   a retained-data managing unit which maintains the retention of data by the data retaining unit until the unnecessary data instructing unit instructs that data do not need to be retained, and which, when the unnecessary data instructing unit instructs so, erases the data retained by the data retaining unit.

4. The facsimile apparatus according to claim 1, further comprising:
   an unnecessary data instructing unit that instructs that data do not need to be retained by the data retaining unit; and
   a retained-data managing unit which maintains the retention of data by the data retaining unit until the unnecessary data instructing unit instructs that data do not need to be retained, and which, when the unnecessary data instructing unit instructs so, erases the data retained by the data retaining unit.

5. The facsimile apparatus according to claim 1, wherein the effectiveness determination unit determines that the print-failure determining unit is not operating properly when the print-failure determination unit detects an abnormal condition.

6. A facsimile apparatus, comprising:
a reception memory that stores data received;
a print executing unit that executes printing on a recording sheet on the basis of the data stored in the reception memory;
a print-failure determining unit that determines whether there is a possibility of a print failure, the print failure including at least one of a print density thinning and a partial depletion, will occur if the print executing unit performs printing;
an effectiveness determination unit that determines whether the print-failure determining unit is operating properly;
a print stopping unit that stops execution of printing by the print executing unit, if the effectiveness determination unit determines whether a present operating state is a state where effective determination by the print-failure determining unit is possible; and
a data retaining unit that, if the effectiveness determination unit determines that the present state is not the state where an effective determination by the print-failure determining unit is possible, retains the data stored in the reception memory even after the data has been printed out regardless of the result of the determination by the print-failure determining unit.

7. The facsimile apparatus according to claim 6, further comprising a forced print instructing unit that is able to forcibly start printing even if execution of printing is stopped by the print stopping unit.

8. The facsimile apparatus according to claim 7, further comprising:
an unnecessary data instructing unit that instructs that data do not need to be retained by the data retaining unit; and
a retained-data managing unit which maintains the retention of data by the data retaining unit until the unnecessary data instructing unit instructs that data do not need to be retained, and which, when the unnecessary data instructing unit instructs so, erases the data retained by the data retaining unit.

9. The facsimile apparatus according to claim 6, further comprising:
an unnecessary data instructing unit that instructs that data do not need to be retained by the data retaining unit; and
a retained-data managing unit which maintains the retention of data by the data retaining unit until the unnecessary data instructing unit instructs that data do not need to be retained, and which, when the unnecessary data instructing unit instructs so, erases the data retained by the data retaining unit.

10. The facsimile apparatus according to claim 6, wherein the effectiveness determination unit determines that the print-failure determining unit is not operating properly when the print-failure determination unit detects an abnormal condition.

11. A multi-function communication device having at least a data reception function and a print function, comprising:
a device main body;
a printing mechanism mounted in the device main body;
a conveyance passage through the main body for passing a recording medium therethrough, the printing mechanism positioned on the conveyance passage;
a photosensitive sensor positioned downstream of the printing mechanism along the conveyance passage in a recording medium feed direction;
a memory for storing received data;
a control unit including a print stopping element for stopping printing on a basis of a signal from the photosensitive sensor, a sensor effectiveness determination element for determining whether the photosensitive sensor signal is reliable, a print-failure determining element for determining whether there is a possibility of a print failure on the basis of the signal from the photosensitive sensor if the sensor effectiveness determination element determines that the photosensitive sensor signal is reliable, a data retention element for retaining the data stored in the memory when either the sensor effectiveness determination element determines that the photosensitive sensor signal is not reliable or the print-failure determining element determines that there is a possibility of a print failure, and a data deletion element for deleting the data stored in the memory after the data has been printed out when the print-failure determining element determines that there is not a possibility of a print failure.

12. The multi-function communication device according to claim 11, wherein the photosensitive sensor comprises a light emitter and a light receiver.

13. The multi-function communication device according to claim 12, further comprising a feed roller opposed to the photosensitive sensor, the feed roller having a black surface.

14. The multi-function communication device according to claim 11, further comprising a force print switch connected to the control unit, the force print switch commanding printing of the received data when the photosensitive sensor is determined to be unreliable.

15. The multi-function communication device according to claim 14, further comprising a reset switch connected to the control unit to command erasure of the received data from the memory following a successful printing.

16. The multi-function communication device according to claim 12, wherein the control unit further comprises a check-mark print unit to print a check-mark in a non-recording area of a recording medium, the photosensitive sensor providing a signal measuring print legibility based on the printed check-mark.

17. The multi-function communication device according to claim 16, wherein the control unit further comprises a calibration unit for adjusting signals output by the photosensitive sensor to reflect recording medium coloration.

18. The multi-function communication device according to claim 17, wherein the control unit further comprises a print failure detecting element that checks whether the calibrated signal from the photo-sensitive sensor at the check-mark exceeds a predetermined value indicating sensor failure and disabling printing.

19. The multi-function communication device according to claim 18, further comprising a force print switch connected to the control unit, the force print switch commanding printing of the received data when the photosensitive sensor is determined to have failed.

20. The multi-function communication device according to claim 19, further comprising a reset switch connected to the control unit to command erasure of the received data from the memory following a successful printing.

21. The multi-function communication device according to claim 13, wherein the control unit further comprises a paper jam detection element, the paper jam detection element determining whether a change by a predetermined amount occurs in the signal from the photosensitive sensor within a predetermined time after a recording medium feed commences.

22. The facsimile apparatus according to claim 11, wherein the sensor effectiveness determination element determines that the photosensitive sensor signal is not reliable when the photosensitive sensor detects an abnormal condition.

* * * * *